May 10, 1960
F. K. H. NALLINGER
2,935,899
DRIVING DEVICE FOR VEHICLES
Filed Sept. 24, 1953
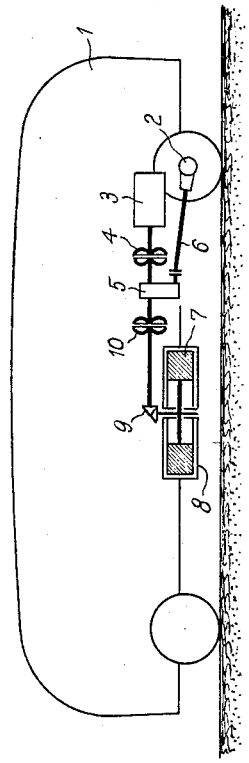
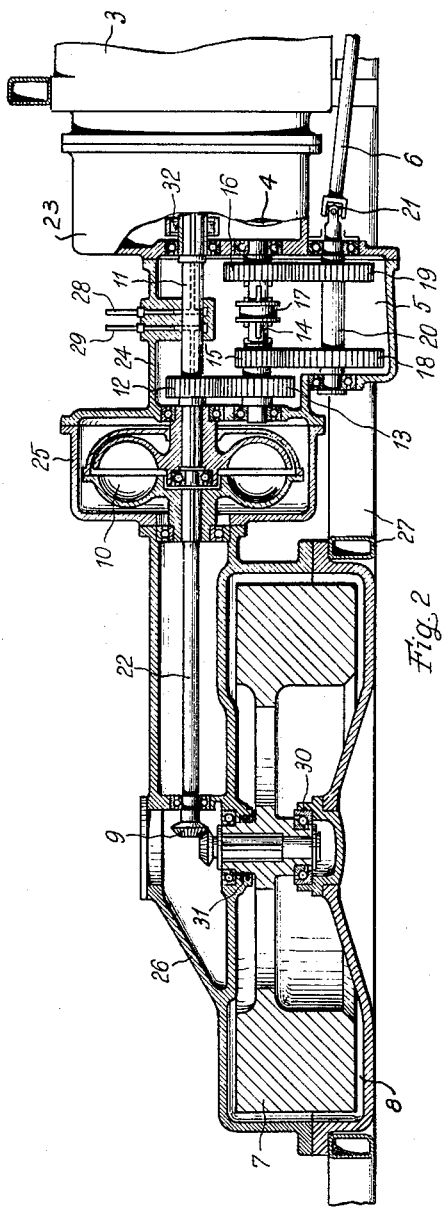
INVENTOR.
FRIEDRICH K.H. NALLINGER.
BY  Dicke and Craig.
ATTORNEYS.

2,935,899

DRIVING DEVICE FOR VEHICLES

Friedrich K. H. Nallinger, Stuttgart, Germany, assignor to Daimler-Benz Aktiengesellschaft, Stuttgart-Unterturkheim, Germany Application September 24, 1953, Serial No. 382,159

13 Claims. (Cl. 74—730)

This invention relates to and has for its object to provide a driving device for vehicles including novel and improved means for utilizing the kinetic energy of a rotating mass.

Another important object of the present invention is to provide a driving device including novel and improved means so arranged as to enable operation with a comparatively small rotating mass.

A further object of the present invention is the provision of means insuring a most economical operation, particularly in application of the invention to buses and the like.

In vehicles, in particular local buses, which are subject to frequent changes in speed, or required to start quite often, the average speed of the vehicle depends to a large degree upon its accelerating ability. As, for example, in the case of buses the stopping time depends as a rule on the traffic requirements and as the permitted maximum speed within the city or town is limited, the total running time and thereby the average speed of the vehicle can only be influenced by acceleration and braking.

However, for obtaining the required energy such an operation presupposes in the hitherto known driving devices of this character very large rotating masses, or fresh charging is already necessary after a relatively short travel to put back the used up energy. Such an operation is therefore unsuited for long distances, apart from the fact that also in short-distance operation charging of energy is inconvenient and connected with expenditure in labor and time.

An important feature of the present invention therefore resides in having a construction in which the vehicle is driven, or can be driven, by a conventional engine, for example, an internal combustion engine, in particular in a manner whereby the vehicle is normally driven by the engine and the gyroscopic mass charged with mechanical energy will only be connected to the drive in an energy discharging manner for acceleration.

According to another feature of the present invention the engine and the rotating mass can simultaneously, or also alternately, be coupled with the drive.

According to a further feature of the present invention the connection of the rotating mass to the drive and, if occasion requires, also that of the normal driving engine thereto is accomplished through the medium of a hydraulic clutch, or hydraulic converter, so as to enable smooth engagement with the drive. Instead of a hydraulic torque converter there may be provided a mechanical, electric, or pneumatic transmission.

The rotating mass runs preferably with a vertical axis of rotation as well as under exclusion of air, or under gases, so as to insure a minimum of friction.

Other objects of the present invention will become apparent from the following description taken in connection with the accompanying drawing in which:

Fig. 1 is a schematic and Fig. 2 a physical embodiment of the invention.

In the vehicle, for example, a bus 1, one of the axles, for example, the rear axle 2 which drives the road wheels, is normally driven by an internal combustion engine 3 via a fluid coupling 4 or a hydraulic converter, a change-speed gear 5 and Cardan shaft 6.

To this end, as clearly shown in Fig. 2, a gear wheel 12 is fixed upon a shaft 11, driven by the power-output part of the fluid coupling 4, and is in mesh with a gear wheel 13 fixedly arranged upon the layshaft 14, while gear wheels 15 and 16 are free to revolve about the latter and can be selectively coupled therewith by means of a claw clutch 17 displaceable in a manner not shown to provide the desired forward speed. The gear wheels 15 and 16 on their part are permanently in mesh with gear wheels 18 and 19 which are fixedly arranged upon a shaft 20 coupled with the propeller shaft 6 by a Cardan joint 21. A reversing gear mechanism (not shown) can be arranged in a known manner for providing a reverse speed, in that, for example, a further pair of gear wheels, which can be uncoupled from each other, are interposed between the gear wheels 12 and 15 upon a further shaft. The transmission may also be provided with further forward speeds.

Further, in the embodiment according to Fig. 2, the rotating mass 7 preferably arranged with a vertical axis of rotation, for example, supported upon a thrust bearing 30, is at the same time in connection with the drive. The rotating mass being connected with the transmission 5, or shaft 11, through a bevel gear 9, a shaft 22 and a hydraulic coupling or clutch 10 or converter and mounted in a chamber 8 which, for example, is hermetically sealed by one or more sealing rings 31. Engine 3, case 23 for the coupling 4, transmission case 24, case 25 for the clutch 10 and housing 26 for the rotating mass 7 are all mounted as one unit and supported upon the frame 27 of the vehicle.

By alternate, or simultaneous, engagement of the clutches and couplings or converters 4 and 10 respectively, for example, by filling and/or emptying one or both of couplings 4 and 10 through the lines 28 and 29 respectively, the vehicle can be driven either by the engine 3 or by the gyroscope 7, or by both at the same time. As is well known, the emptying of coupling fluid from a coupling reduces or precludes the transfer of torque therethrough and conversely the filling with coupling fluid enables the transmission of torque.

Alternatively an overrunning clutch 32 may also be interposed between engine 3 and transmission 5 which disconnects the engine as soon as the speed thereof, with due regard to eventually interposed transmissions, drops below that of the gyroscopic mass 7.

Charging the gyroscope with energy preferably takes place only when the vehicle has reached a certain higher speed, or only on application of the brakes, in that the braking energy is supplied to the gyroscope by accelerating the same. The gyroscope can also be charged while the vehicle is traveling by taking energy from the engine connected with the drive as well as by supplying it with braking energy.

It will be obvious from the foregoing that the driving device fulfills the several objects of the present invention, and that it is capable of imparting high acceleration to the vehicle from the stored up energy in the gyroscopic mass. The dimensions of the gyroscope can be kept within reasonably small limits. Charging the gyroscope from the braking energy affords the further advantage that no additional energy will be required for the charging and, what is more, enables reduction in fuel consumption as the otherwise lost braking energy is utilized for accelerating the vehicle.

What is claimed is:

1. A driving device for vehicles comprising a road wheel, a driving engine, a gyroscopic mass rotatable about an axis, and transmission means for driving both said gyroscopic mass and said road wheel by said engine and for transferring driving torque between said gyroscopic mass and said wheel without driving said engine comprising, two torque-transmitting coupling means interconnecting said engine and said mass, means for connecting said mass to said wheel through one of said coupling means, means for connecting said engine to said wheel through the other of said coupling means, and means for preventing the transfer of driving torque from said gyroscopic mass to said engine through the other of said coupling means.

2. A driving device according to claim 1 wherein each of said coupling means is a hydraulic coupling, including a shaft for driving said road wheel, said shaft being connected to said one coupling means on the side thereof opposite the gyroscopic mass.

3. The driving device of claim 1, wherein said transmission means are operative to enable a transmission of driving torque simultaneously from both said driving engine and said gyroscopic mass to said road wheel.

4. The driving device of claim 1 including, means for interrupting said transmission means between said driving engine and said road wheel, and means for interrupting said transmission means between said gyroscopic mass and said road wheel independent of said first-mentioned interrupting means.

5. The driving device of claim 2, including means for filling and emptying said two hydraulic couplings.

6. The driving device of claim 1 in combination with a change-speed gear in said transmission means between said driving engine and said road wheel on the one hand, and said gyroscopic mass and said road wheel, on the other hand.

7. The driving device of claim 2 in combination with a change-speed gear between said hydraulic couplings, on the one hand, and said shaft, on the other hand.

8. The driving device of claim 1, wherein said transmission means between said driving engine and said gyroscopic mass comprise a horizontal line of axially spaced shafting, in combination with bearing means for rotatably supporting said gyroscopic mass with a vertical axis of rotation, a bevel gearing between said horizontal line of shafting and said gyroscopic mass, a speed-change transmission connected to said horizontal line of shafting and forming a further part of said transmission means, and an essentially horizontal propeller shaft immediately following said transmission and connected therewith for driving said road wheel.

9. A driving device for vehicles comprising a pair of road wheels, a driving engine, a gyroscopic mass rotatable about an axis, a shaft for driving said road wheels, means for disconnecting said drive shaft from said engine without disconnecting said drive shaft from said gyroscopic mass including a hydraulic coupling between said shaft and said engine, on the one hand, and a hydraulic coupling between said shaft and said gyroscopic mass, on the other, said hydraulic couplings comprising a driving and a driven part each, in combination with a further shaft for connecting said driving engine with the driving part of said first-named hydraulic coupling, a third shaft for connecting said gyroscopic mass with the driving part of said second-named hydraulic coupling independently of said second shaft, a fourth shaft for connecting the two driven parts of said two hydraulic couplings, all of said three last-named shafts as well as said hydraulic couplings being arranged coaxially with respect to each other wherein said three last-named shafts are axially spaced from each other, and a change speed gear between said fourth-named shaft and said first-named shaft for driving said road wheels.

10. A driving device according to claim 9, wherein said gyroscopic mass is arranged with a vertical axis, beveled gear means being provided connecting said gyroscopic mass to said third shaft.

11. A driving device for vehicles comprising a road wheel, a driving engine, a gyroscopic mass, a change-speed gear, first means including a selectively disconnectible hydraulic coupling for connecting said engine with said change-speed gear, second means including a selectively disconnectible hydraulic coupling for connecting said change-speed gear with said gyroscopic mass, third means for connecting said change-speed gear with said road wheel, said second means comprising a horizontal shaft for driving the respective hydraulic coupling, and said gyroscopic mass being rotatable about a vertical axis with fourth means for driving said horizontal shaft by said vertically arranged gyroscopic mass, and a housing aggregate surrounding said change-speed gear, said first and second means and said gyroscopic mass and being combined with said engine in a unit.

12. A driving device for vehicles according to claim 11, wherein said housing aggregate comprises a chamber for hermetically sealing said gyroscopic mass in a vacuum.

13. A driving device for vehicles comprising the combination of a road wheel, a driving engine, a gyroscopic mass rotatable about an axis, transmission means for selectively transmitting a driving torque from said driving engine to said road wheel as well as a driving torque from said driving engine to said gyroscopic mass and a driving torque from said gyroscopic mass to only said road wheel and independently of said driving engine, and a freewheeling device between said driving engine, on the one hand, and both said gyroscopic mass and said road wheel, on the other hand, for automatically disconnecting said driving engine from said transmission means when the speed of said gyroscopic mass exceeds that of said engine.

References Cited in the file of this patent

UNITED STATES PATENTS

| | | |
|---|---|---|
| 745,441 | Hospitalier | Dec. 1, 1903 |
| 1,279,471 | Sperry | Sept. 17, 1918 |
| 1,814,607 | Sanders | July 14, 1931 |
| 2,093,042 | Fottinger | Sept. 14, 1937 |
| 2,413,285 | Bousky | May 8, 1944 |

FOREIGN PATENTS

| | | |
|---|---|---|
| 998,595 | France | Sept. 26, 1951 |
| 441,390 | Great Britain | Jan. 20, 1936 |
| 613,370 | Great Britain | Nov. 25, 1948 |